UNITED STATES PATENT OFFICE.

LAWRENCE KING, OF BALTIMORE, MARYLAND.

FOOD COMPOUND.

No. 915,186.  Specification of Letters Patent.  Patented March 16, 1909.

Application filed May 26, 1908. Serial No. 435,149.

*To all whom it may concern:*

Be it known that I, LAWRENCE KING, a citizen of the United States, residing at Baltimore city, State of Maryland, have invented certain new and useful Improvements in Food Compounds, of which the following is a specification.

My invention to be hereinafter described relates to food compounds and has for its object the preparing and treatment of vegetables and in combining them in a food product possessing preservative qualities, so that the compound may remain wholesome and ready for use as human food for an indefinite time, as will hereinafter appear.

Heretofore the cucumber vegetable has mostly been put on sale in what might be termed a pickled state, and although it may have been used as an ingredient in many pickled compounds, heretofore no method has ever been discovered by which it could be preserved and still retain its quality and flavor as in its natural state, inasmuch as the pickled cucumber or "pickle" as it is universally known, is as such, distinctive from the cucumber in its natural or green state, consequently it has been possible to obtain the cucumber only at certain periods or seasons when the vegetable can be grown and marketed for consumption within a reasonably short time, consequently when the vegetable is what is termed "out of season", the pickled cucumber has to be depended upon to supplant the cucumber in its natural state.

Inasmuch as the vegetable onion in its natural state has always to a certain degree found favor and been served with the cucumber in its natural state, I have compounded this vegetable with that of the cucumber in such a manner as to render the compound a most palatable form of food, and by my method of preservation I am enabled to preserve and supply the market with this most delicious food compound which can scarcely be distinguished from the vegetables in their natural state.

In practice I have found the best results to be secured in combining the ingredients in substantially the proportions or relative quantities as follows: 8 pounds of cucumbers, 1 pound of onions, 1 ounce of black pepper, 3 quarts of vinegar, 1 quart of water, one-half pound of sugar.

The cucumbers are first peeled and transversely sliced at a desired thickness (preferably very thin and wafery), they are then placed in a strong brine solution, made from approximately eight ounces of salt to a gallon of water and permitted to remain in the solution for a period of at least five hours, at the expiration of which time they are taken from the solution and pressed for the purpose of removing as much of the brine solution as has been absorbed by the cucumbers as possible by this operation. After this operation the onions which are preferably sliced are then thoroughly mixed with the cucumbers, to the mixture is then added the pepper. The mixture is then put in cans or other suitable receptacles over which is poured a suitable quantity of the solution made from the vinegar, water and sugar. The cans are then sealed by what is known as a capping and tipping process. After the cans containing the mixture are capped and tipped, they are then placed in steam kettles and processed or cooked from one to two minutes at a temperature of 212 degrees, at the expiration of which time the cans are removed and untipped while hot, that the air contained in the cans be excluded therefrom by permitting it to escape. As soon as the air has been permitted to escape (which occurs almost instantly the moment they are untipped) and before the cans are permitted to become cooled, they are retipped and immediately chilled by being immersed in a cold bath. Prepared in this form the compound resembles the vegetables in their natural state and their natural flavor to a degree preserved, rendering the distinction between the compound and the vegetables in their natural state almost impossible, and when so prepared the compound will remain wholesome and ready for use as human food for an indefinite time.

Having fully described my invention, what I claim as new and desire to secure by Letters Patent, is:

The herein described method for preparing and preserving a food compound comprising cucumbers and onions, the said cucumbers being sliced into pieces and placed in a solution of salt and water and permitted to remain therein a requisite length of time, after which they are removed and the solution pressed therefrom, a suitable quantity of sliced onions and black pepper being then added thereto, the ingredients are then thoroughly mixed, placed in cans to which is added a solution composed of vinegar, water and sugar, the cans containing the ingredients are then capped, tipped and processed for a period of from one to two minutes at a temperature of two hundred and twelve degrees, at the expiration of which time and while hot, the cans are untipped and the air excluded therefrom, after which they are re-tipped and immediately chilled by being immersed in a cold bath, substantially as described.

In testimony whereof I affix my signature in presence of two witnesses.

LAWRENCE KING.

Witnesses:
E. WALTON BREWINGTON,
BROWN M. ALLEN.